United States Patent [19]
Pankow

[11] 3,896,519
[45] July 29, 1975

[54] WINDSHIELD WIPER CONNECTOR

[75] Inventor: Herbert G. Pankow, Keenesburg, Colo.

[73] Assignee: The Gates Rubber Company, Denver, Colo.

[22] Filed: Oct. 29, 1974

[21] Appl. No.: 518,666

[52] U.S. Cl. .............................................. 15/250.32
[51] Int. Cl.² ............................................. B60S 1/40
[58] Field of Search .................................................
        15/250.31–250.42

[56] References Cited
UNITED STATES PATENTS

| | | | |
|---|---|---|---|
| 2,694,827 | 11/1954 | Bacher | 15/250.32 |
| 3,757,377 | 9/1973 | Hayhurst | 15/250.32 |
| 3,843,994 | 10/1974 | Smithers | 15/250.32 |

FOREIGN PATENTS OR APPLICATIONS

| | | | |
|---|---|---|---|
| 1,376,423 | 9/1964 | France | 15/250.32 |
| 1,414,690 | 9/1965 | France | 15/250.32 |
| 2,128,739 | 12/1971 | Germany | 15/250.32 |
| 1,100,069 | 1/1968 | United Kingdom | 15/250.32 |

Primary Examiner—Peter Feldman
Attorney, Agent, or Firm—Curtis H. Castleman, Jr.; Raymond Fink; H. W. Oberg, Jr.

[57] ABSTRACT

An assembly for connecting a windshield wiper adaptably to different sized wiper arms of the shepard's crook type. The assembly comprises a U-shaped bracket on which is mounted a preferably molded plastic insert which has an upper grooved surface and an under surface embraced by the crook of the wiper arm and means for locking the assembly into engagement with the wiper arm.

9 Claims, 4 Drawing Figures

PATENTED JUL 29 1975　　　　　　　　　　　　　　3,896,519
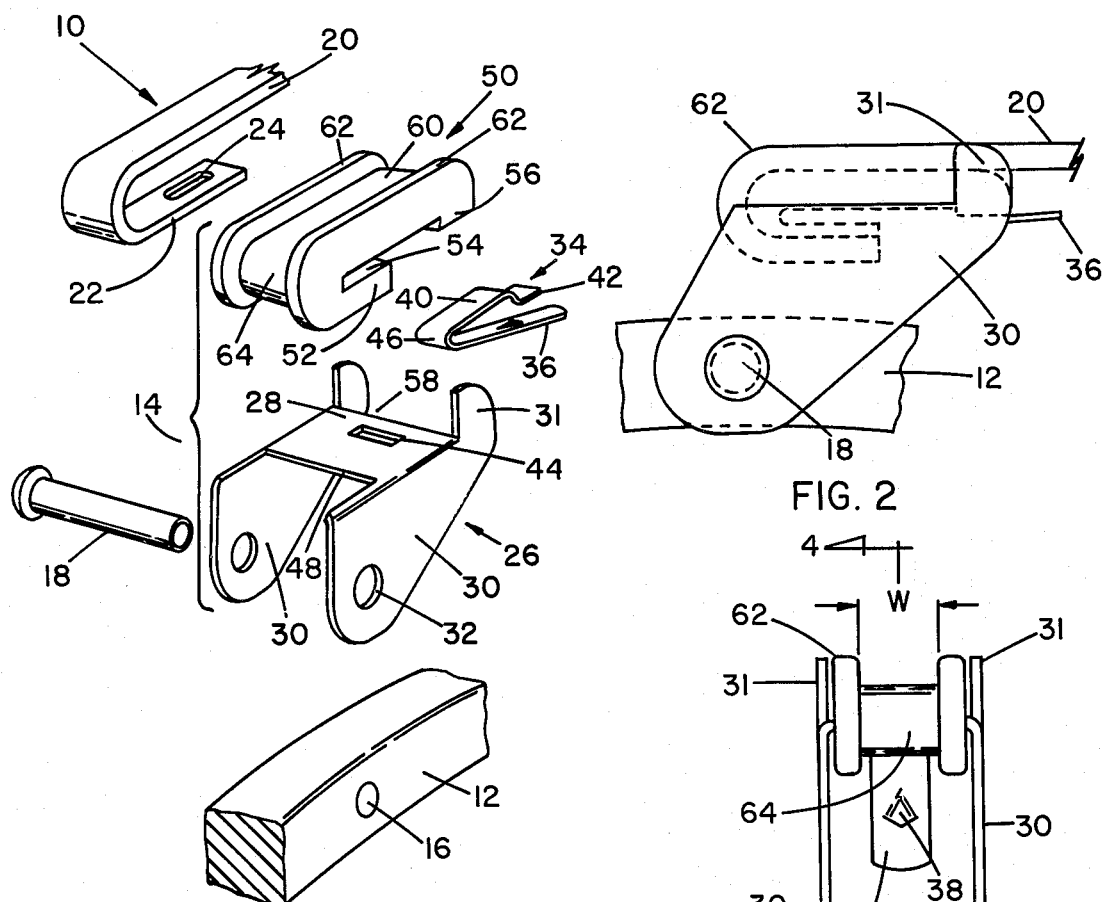
FIG. 1
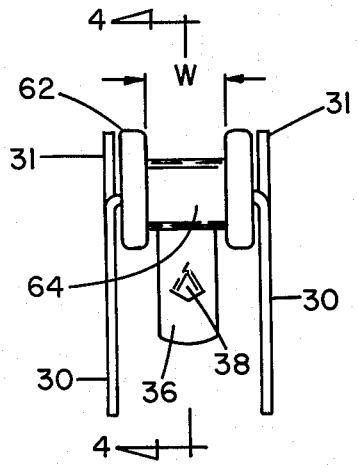
FIG. 2
FIG. 3
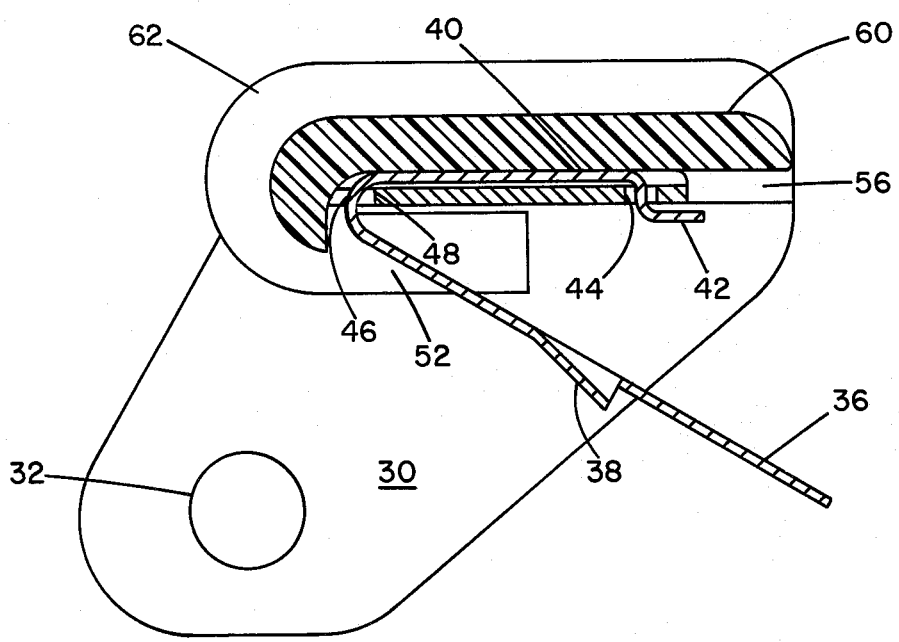
FIG. 4

WINDSHIELD WIPER CONNECTOR

BACKGROUND OF THE INVENTION

This invention relates to a windshield wiper clip assembly, and more particularly applies to a universal connector to fit wide, medium and narrow shepard's crook wiper arms.

The attachment end of the shepard's crook wiper arm is generally U-shaped with a reversely turned tip extending approximately parallel to the wiper arm body and which has a notch in the tip for engagement with a connector attached to a windshield wiper blade. Since the shepard's crook wiper arm comes in three distinct sizes, usually three different size connector assemblies are required to fit a complete line of wiper arms.

This invention has for its primary object the provision of a universal connector which selectively employs alternatively any of three different sized adapters to fit each of the respective wiper arm sizes.

SUMMARY OF THE INVENTION

Briefly described, there is provided according to the invention an assembly for connecting a windshield wiper blade adaptably to different sized wiper arms of the shepard's crook type, the assembly comprising a bracket of generally U-shaped cross-section having a pair of downward extensions joined by a bridge and which is engageable with a windshield wiper, an insert adapter having an upper grooved surface for receipt of the wiper arm body and at least one inturned projection on the bottom of the insert securely embracing the bridge portion of the bracket, and means attached to the bracket for locking the connector assembly into engagement with the wiper arm.

BRIEF DESCRIPTION OF THE DRAWINGS

Description of certain preferred embodiments of the invention will be made with reference to the accompanying drawings, in which:

FIG. 1 is a perspective view of the connector assembly together with engaging portions of the wiper arm and wiper blade, shown exploded;

FIG. 2 depicts the assembly of FIG. 1 assembled in side view;

FIG. 3 is a front view of the connector assembly only; and

FIG. 4 is a view taken along section 4—4 of FIG. 3.

PREFERRED EMBODIMENTS OF THE INVENTION

Referring to the drawings, the end of a shepard's crook wiper arm generally designated at 10 is connectable to a windshield wiper blade 12 by the connector assembly 14 of the subject invention. The windshield wiper blade, which forms no part of the invention, may consist of the usual squeegee wiping element, backing member (neither shown) and superstructure consisting of a series of yokes or levers. Intermediate the ends of the superstructure is a bore 16 which receivably engages the connector assembly 14 by a transversely disposed rivet or pin 18.

The shepard's crook wiper arm end includes a body portion 20 from which extends a reversely turned tip 22 disposed below the body portion and generally parallel thereto. The tip contains a slot 24 for releasably locking the arm to the clip assembly, as more particularly described hereafter.

The clip assembly, according to the invention, includes a bracket member 26 of generally U-shaped cross-section having a bridge portion 28 from which depend a pair of legs 30. The legs are provided with aligned bores 32 engagable with the superstructure 12 with the aid of retention pin 18. The bracket also has upwardly extending ears 31 at its rearward portion. The bridge 28 of the bracket carries a resilient spring member 34 having a free lever end 36 for releasably engaging the connector assembly with the reversely turned tip of the wiper arm. Protrusion 38 engages the slot 24 of the wiper arm tip for this purpose. The upper portion 40 of the spring is affixed to the bridge of the bracket by hooking the end 42 into the slot 44 of the bridge, with the intermediate portion 46 of the spring bent around the forward portion 48 of the bridge. Alternatively, the spring could be riveted or welded to the bridge portion of the bracket.

Onto the bracket is mounted a removable insert adapter 50 having an upper grooved surface 60 (defined by siderails 62) which curves forwardly at 64 to receive the wiper arm body 20 and tip 22 of the crook of the desired size. A pair (in general at least one) of inturned legs 52 reversely turned with respect to the bridge portion 28 of the bracket define a slot 54 within which is securely embraced the bridge 28. Moreover, lengthwise movement of the insert member 50 with respect to the bracket is restricted by virtue of the engagement between downturned rearward projections 56 and the notch 58 formed in the rearward portion of the bridge. The insert adapter can be removed from the bracket by forcing the projection 56 upwardly from the notch 58 and sliding the elements apart so that the bridge 28 is disengaged from the slot 54.

Inasmuch as during the operation of the wiper in its to and fro oscillation across a windshield there will be significant lateral and torsional forces transmitted to the insert and bracket assembly, it is important to prevent substantial relative movement between these parts. In this respect, it is thus preferred to employ the upstanding ears 31 at the rearward portion of the bracket to embrace the rearward portion of the insert member and prevent its substantial sidewise deflection. The frontal side portions of the insert in turn bear against the front side portions of the bracket to prevent relative sidewise displacement of the front of the insert with respect to the bracket, as best shown in FIG. 3.

A single bracket may accommodate any of the three insert adapters to fit the respective three sizes of shepard's crook wiper arm. In this respect, as shown in FIG. 3, the width w of the upper groove of the insert is chosen to closely fit the width of the shepard's crook arm. To substitute a different width adapter, the spring 36 is depressed upwardly, the wiper arm removed, the old adapter slid forwardly off the bracket, and a new adapter engaged in its place preparatory to receiving its matched wiper arm.

The bracket member may desirably be formed of a metal stamping although molded plastic material may also be utilized. Because the insert member is preferably made of a plastic molded article, there will virtually be no metal to metal contact and noise will be suppressed as a result of use of the connector assembly of the subject invention.

It will be understood that the invention is capable of a variety of modifications and variations which will become apparent to one skilled in the art upon a reading of the present specification, and which are to be included within the scope of the claims appended hereto.

What is claimed is:

1. An assembly for connecting a windshield wiper adaptably to different sized wiper arms of the shepard's crook type, the wiper arm having an arm body and a reversely turned tip extending beneath the body, the assembly comprising:
   a bracket of generally U-shaped cross-section having a bridge portion from which a pair of legs depend, said legs having means for receivably engaging a windshield wiper;
   an insert having an upper grooved surface for receipt of the wiper arm body and at least one inturned projection on the bottom of the insert defining an open-ended slot, said bridge portion of the bracket being securely embraced in the slot;
   means carried by the bracket for locking the assembly into engagement with the reversely turned tip of the wiper arm.

2. The assembly of claim 1 wherein the means carried by the bracket comprises a resilient spring one end of which is attached to the bridge and the other end of which is normally freely disposed beneath the bridge and which has a protrusion lockingly engageable with the tip of the wiper arm.

3. The assembly of claim 1 wherein the rearward portion of the bridge is notched and receives at least one downturned projection formed on the rearward portion of the insert for locking engagement therewith.

4. The assembly of claim 1 wherein the rearward portion of the bracket carries upwardly turned stops for limiting sidewise deflection of the insert with respect to the bracket during operation of the assembly.

5. The assembly of claim 1 wherein the insert is formed of a molded polymeric material.

6. A windshield wiper assembly comprising a squeegee, a backing member for retention of the squeegee, and a superstructure slidably attached to said backing member, in combination therewith a connector assembly for rockably attaching the superstructure to a wiper arm comprising:
   a bracket having a bridge portion from which a pair of downwardly extending legs depend, said legs being pivotably mounted to said superstructure;
   a lever having an upper portion attached to said bridge and a lower free end disposed below the bridge and between said legs; and
   a removable insert adapter embracing said bridge and having an upper grooved surface for receipt of the wiper arm, and downturned projection means engaged securely in notch means formed at the rearward portion of the bridge of the bracket.

7. The assembly of claim 6 wherein the insert adapter has at least one inturned projection on its lower surface defining a slot, said bridge protion of the bracket being positioned in said slot.

8. The assembly of claim 6 wherein the rearward portion of the bracket carries upwardly turned stops for limiting sidewise deflection of the insert with respect to the bracket during operation of the assembly.

9. The assembly of claim 6 wherein the insert adapter is formed of a material dissimilar from the material from which the bracket is formed.

* * * * *